United States Patent
Nagaraj

(10) Patent No.: US 7,684,512 B2
(45) Date of Patent: Mar. 23, 2010

(54) METHOD OF SCHEDULING MOBILE USER TRANSMISSIONS AND METHODS OF DECODING MOBILE USER TRANSMISSIONS

(75) Inventor: Shirish Nagaraj, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 955 days.

(21) Appl. No.: 11/408,019

(22) Filed: Apr. 21, 2006

(65) Prior Publication Data

US 2007/0248045 A1 Oct. 25, 2007

(51) Int. Cl.
*H04L 27/00* (2006.01)
(52) U.S. Cl. ...................................... 375/295
(58) Field of Classification Search ......... 375/132–133, 375/135–136, 260, 267, 299, 346–347; 370/329, 370/332, 334
See application file for complete search history.

(56) References Cited

U.S. PATENT DOCUMENTS

| | | | |
|---|---|---|---|
| 7,120,199 B2 * | 10/2006 | Thielecke et al. ........... | 375/267 |
| 7,194,041 B2 * | 3/2007 | Kadous ....................... | 375/267 |
| 7,266,168 B2 * | 9/2007 | Kwak et al. ................. | 375/347 |
| 2003/0189999 A1 * | 10/2003 | Kadous ....................... | 375/349 |
| 2006/0203891 A1 * | 9/2006 | Sampath et al. ............. | 375/132 |

* cited by examiner

*Primary Examiner*—Khanh C Tran
(74) *Attorney, Agent, or Firm*—Harness, Dickey & Pierce

(57) ABSTRACT

In an example method of scheduling mobile users, mobile users are assigned to one of at least a first layer and a second layer, where each of the first and second layers are associated with a same frequency band. The mobile users are further assigned, in the first layer, to different frequency sub-bands in the frequency band such that the users in the first layer have non-overlapping first sub-band assignments. The mobile users are further assigned, in the second layer, to different frequency sub-bands in the frequency band such that the users in the second layer have non-overlapping second sub-band assignments. The mobile users are then scheduled for transmission based on the first and second layer and the first and second sub-band assignments. In a further example decoding method, layer transmissions are decoded in succession with interference cancellation performed between each layer decoding step. In a second example decoding method, mobile users in multiple layers and within assigned channels are jointly decoded.

18 Claims, 12 Drawing Sheets

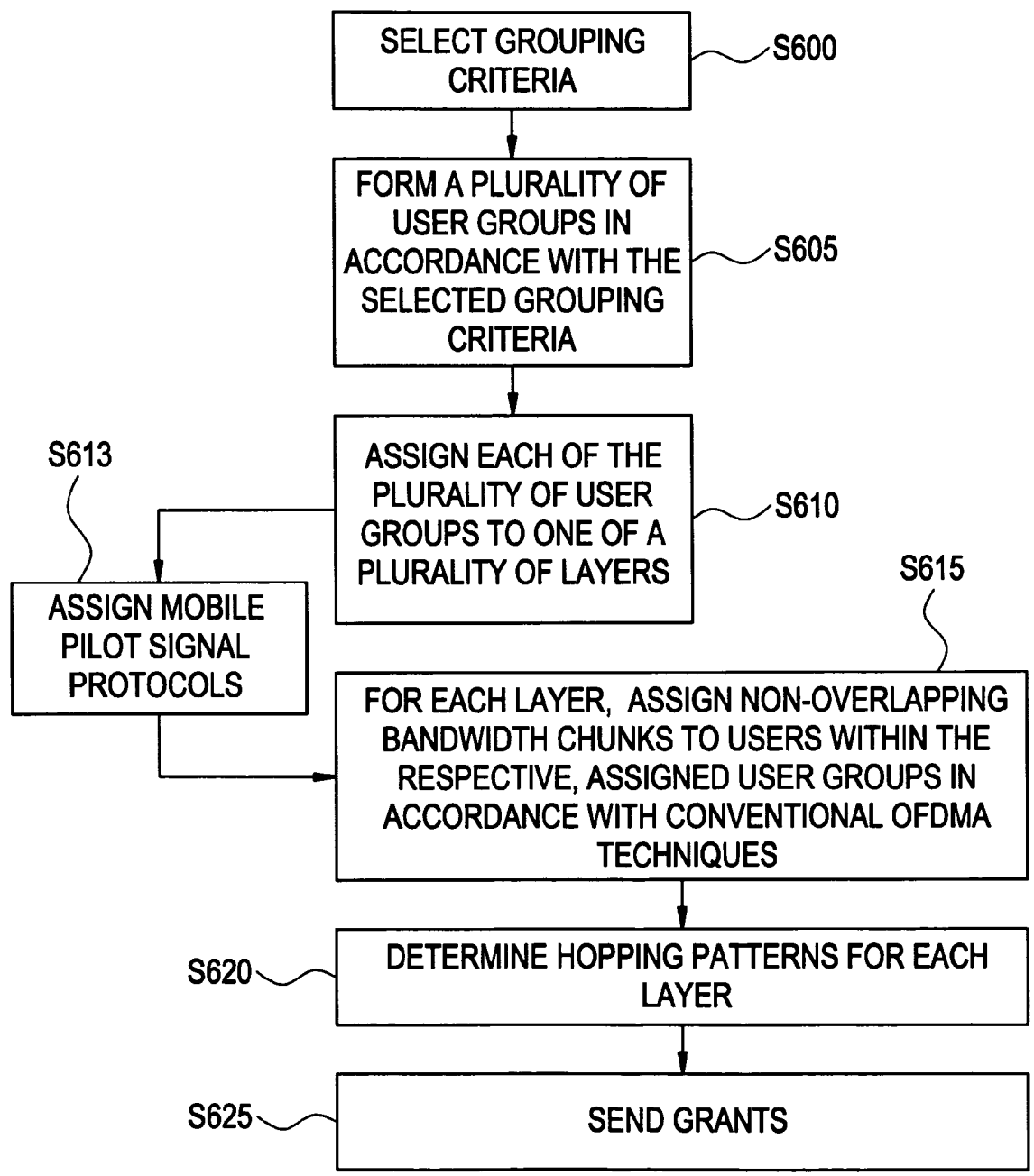

METHOD OF SCHEDULING MOBILE USER TRANSMISSIONS AND METHODS OF DECODING MOBILE USER TRANSMISSIONS

BACKGROUND OF THE INVENTION

1. Field of the Invention

Example embodiments of the present invention relate generally to communications systems, and, more particularly, to wireless communication systems.

2. Description of the Related Art

Conventional wireless communication systems include one or more base stations or base station routers, which may also be referred to as access points, node-Bs or access networks, for providing wireless connectivity to one or more mobile units, which may also be referred to using terms such as user equipment, subscriber equipment, and access terminals. Examples of mobile units include cellular telephones, personal data assistants, smart phones, text messaging devices, laptop/notebook computers, desktop computers and the like. Each base station may provide wireless connectivity to one or more mobile units, such as the mobile units in a geographical area, or cell, associated with the base station. Alternatively, a base station router may be used to provide wireless connectivity to the mobile units.

Messaging sent from a base station or base station router to one or more mobile units is generally referred to as "forward link" or "downlink" messaging. Messaging sent from a mobile unit to a base station or base station router is generally referred to as "reverse link" or "uplink" messaging.

Orthogonal frequency division multiplexing (OFDM) is an efficient modulation scheme for signal transmission over frequency-selective channels. In OFDM, a wide bandwidth is divided into multiple narrow-band sub-carriers, which are arranged orthogonal with each other. The signals modulated on the sub-carriers are transmitted in parallel.

OFDM may be used to support multiple access for multiple subscribers through time division multiple access (TDMA), in which each subscriber uses all the sub-carriers within its assigned time slots. Orthogonal frequency division multiple access (OFDMA) is another method for multiple access, using the basic format of OFDM. In OFDMA, multiple subscribers simultaneously use different sub-carriers, in a fashion similar to frequency division multiple access (FDMA) (e.g., for each "shared" carrier, frequency divisions are used to allow multiple access).

OFDMA divides a signal into sub-channels (i.e., groups of carriers), with each sub-channel being allocated to a different subscriber. Different sub-channels may then be combined from various carriers. Each subscriber can be treated separately, independent of location, distance from the base station, interference and power requirements. Various modulations can be used for each of the carriers in the system to provide improved coverage and throughput. The sub-channel structure of the OFDMA enhancement enables more efficient duplexing techniques, such as Frequency Division Duplexing (FDD) and Time Division Duplexing (TDD), and creates a signal with reduced interference and capable of higher data throughput. In FDD systems, both forward link and reverse link transmissions occur simultaneously on different carriers.

FIG. 1 illustrates a conventional wireless communication system 100. In an example, the wireless communication system 100 may be representative of either an OFDMA system or a Code Division Multiple Access (CDMA) system.

As shown in FIG. 1, the wireless communication system 100 includes a plurality of user equipments (UEs) 105/110 in communication with one or more serving Node Bs 120/125 over an air interface. The plurality of Node Bs are connected to a radio network controller (RNC) 130 with a wired interface. Alternatively, while not shown in FIG. 1, the functionality of both the RNC 130 and Node Bs 120/125 (alternatively referred to as "base stations") may be collapsed into a single entity referred to as a "base station router". The RNC 130 accesses an internet 160 through a gateway support node (GSN) 150 and/or accesses a public switched telephone network (PSTN) 170 through a mobile switching center (MSC) 140.

CDMA transmissions have more in-cell interference than OFDMA systems because each CDMA mobile user transmits to a serving base station across an entire frequency band, while OFDMA mobile users are assigned to one of a plurality of sub-bands or sub-channels within the frequency band. Mobile users assigned to different OFDMA sub-channels do not interfere with each other, or at least, only to a negligible degree. However, OFDMA systems may still experience interference because a serving base station typically does not coordinate its assigned OFDMA sub-channels with neighboring base stations. Therefore, a neighboring base station may assign one or more of its OFDMA mobile users to the same sub-channel, causing interference referred to as "outer-cell interference". Also, a neighboring CDMA system would also cause outer-cell interference because at least a portion of the CDMA transmissions would overlap, in frequency, with the assigned OFDMA sub-channel.

FIG. 2 illustrates a transmitter 200 in a conventional OFDMA system. In an example, the transmitter 200 of FIG. 2 is employed within a transmitting entity (e.g., Node B 120/125, UE 105/110, etc.) within the conventional OFDMA system 100 of FIG. 1.

As shown in FIG. 2, the transmitter 200 includes a modulator 210, a serial-to-parallel (S2P) converter 220, an Inverse Fast Fourier Transformer (IFFT) module 230, a cyclic prefix inserter 240 and a time domain filter 250. The IFFT module 230 includes N ports for receiving modulation symbols. Each of the N ports is associated with an orthogonal sub-carrier. IFFT module 230 is operable to use an N×N IFFT matrix to perform transform operations on its inputs, wherein the entries of the matrix $F_{j,k}$ are defined as $F_{j,k}=e-2^{\pi ijk/n}$, j, k=0, 1,2, . . . , n−1 and i=$\sqrt{-1}$.

Encoded data symbols are provided as input to modulator 210. Modulator 210 uses well-known modulation techniques, such as BPSK, QPSK, 8PSK, 16QAM and 64QAM, to convert the encoded data symbols into K modulation symbols which are then provided as input to the S2P converter 120, where K≦N. The S2P converter 220 outputs parallel streams of modulation symbols, which are provided as inputs to one or more of the N ports of the IFFT module 230. In the IFFT module 230, an inverse fast Fourier transformation is applied to the modulation symbols to produce a block of chips cn, where n=0, . . . ,N−1. The cyclic prefix inserter 240 copies the last Ncp chips of the block of N chips and prepends them to the block of N chips producing a prepended block. The prepended block is then filtered through time domain filter 250 and subsequently modulated onto a carrier before being transmitted.

FIG. 3 illustrates a mobile user frequency allocation within a conventional OFDMA system. As shown in FIG. 3, users 1, 2, 3, and 4 are assigned to separate orthogonal bandwidth or frequency "chunks" within the total OFDMA frequency band [X . . . Y]. As shown, the total OFDMA frequency band is inclusive of frequencies X and Y, and the frequency band may be established with well-known OFDMA communication protocols. Also shown for each of users 1, 2, 3 and 4 are their associated data rates within each bandwidth chunk.

As shown in FIG. 3, OFDMA base stations attempt to achieve "fairness" by allocating lower data rate mobile users larger chunks of bandwidth. In other words, the areas under the data rate/bandwidth curves associated with the different users 1, 2, 3 and 4 are configured to be roughly equal over time. Thus, OFDMA frequency band allocations to users are typically more efficient, or achieve better total "sector capacity", when all mobile users transmit at substantially the same data rate, or have the same channel strength, because larger chunks of bandwidth need not be allocated to a lower data rate mobile user at the expense of a higher data rate mobile user.

Additionally, OFDMA comes with the cost of increased signaling and a failure to provide bandwidth sharing for users transmitting at lower data rates and/or requiring fast access to a carrier. In contrast, CDMA systems allow multiple subscriber access without explicit request-and-grant mechanisms, as present in conventional OFDMA, and this may increase user access to the carrier for transmissions.

Certain conventional CDMA systems can approach, and in some cases exceed, the reduced interference characteristic of OFDMA systems. Such a CDMA system may be referred to as Interference Cancellation (IC)-CDMA. IC-CDMA systems are structurally similar to the conventional wireless communication system 100 of FIG. 1. IC-CDMA systems, however, include an interference canceller (IC) at each receiver (e.g., Node Bs 120/125, UEs 105/110, etc.).

A decoding process for mobile users within a conventional IC-CDMA system will now be described. First, a plurality of users 1, 2, 3, etc., are scheduled in a queue for decoding at a receiver with an IC, such as Node B 120/125 within wireless communication system 100 of FIG. 1.

Also, as is characteristic of conventional CDMA systems, each user's transmissions are spread throughout an entirety of the CDMA frequency band, and accordingly interfere with each other. The total IC-CDMA frequency band may span a given range which may be established with well-known IC-CDMA communication protocols.

In conventional IC-CDMA, in order to achieve optimal spectral efficiency, mobile users are decoded one after the other in succession. The IC-CDMA scheduling queue for user decoding is typically arranged from a "best" user to a "worst" user. Thus, a first decoded user is the "best" user, or the user with the highest signal-to-noise ratio (SINR). Likewise, a last decoded user is the "worst" user, and thereby has the lowest SINR.

After the first decoded user is decoded successfully, re-estimation of the channel, re-encoding of the data and cancellation of the first decoded user's decoded signal from the residual received signal is performed. The resulting residual signal is used for decoding the next user (i.e., a second decoded user), and so on. Thus, it will be appreciated that the first decoded user does not receive any benefit of the interference cancellation because it is decoded first, while the last decoded user receives the benefit of interference cancellation from the decoding of each previously decoded user (e.g., the first decoded user, the second decoded user, and so on).

Conventional IC-CDMA systems may be very effective in reducing in-cell interference (e.g., to OFDMA-like levels). Further, unlike OFDMA, the interference cancellation process may also have some beneficial effect upon outer-cell interference. However, because these computations are performed between each user's decoding, the interference cancellation process of IC-CDMA is a computationally expensive procedure. Also, this computational cost scales with the number of users served by a base station within the IC-CDMA system.

OFDMA receivers, by contrast, are less complex than IC-CDMA receivers because they lack the above-described computational requirements of the IC-CDMA interference cancellation process. However, OFDMA is slow to grant mobile users access to sub-channels because the mobile users must request permission to transmit and wait for permission to be granted, by the base station, on a particular sub-channel. Also, OFDMA does not provide bandwidth "sharing" (e.g., superposed transmissions, such as the collective assignment of low data rate mobile users within over-lapping bandwidth chunks), thereby decreasing the spectral efficiency of OFDMA systems. Thus, OFDMA systems can be said to achieve lower interference with relatively simple receivers (e.g., compared to IC-CDMA receivers) at the expense of increased transmission set-up latency and spectral inefficiency.

SUMMARY OF THE INVENTION

An example embodiment of the present invention is directed to a method of scheduling transmission in a wireless communication system. The example embodiment includes assigning users to one of at least a first layer and a second layer, where each of the first and second layers is associated with a same frequency band. The users in the first layer are assigned to different frequency sub-bands in the frequency band such that the users in the first layer have non-overlapping first sub-band assignments. Similarly, the users in the second layer are assigned to different frequency sub-bands in the frequency band such that the users in the second layer have non-overlapping second sub-band assignments. The users are scheduled for transmission based on the first and second layer and the first and second sub-band assignments.

Another example embodiment of the present invention is directed to a method of decoding transmissions in a wireless communication system. This example embodiment includes first decoding transmissions received from a first set of mobile users, where the first transmissions are received on a first set of non-overlapping frequencies. The first decoded transmissions are then canceled from a received signal spectrum to obtain a cancelled signal spectrum. The transmissions received from a second set of mobile users in the cancelled signal spectrum are then decoded. The second transmissions are received on a second set of non-overlapping frequencies, and the first and second sets of non-overlapping frequencies overlap with each other.

Another example embodiment of the present invention is directed to a method of decoding mobile station transmissions in a wireless communication system. This example embodiment includes decoding transmissions received in a first frequency band associated with a first channel, where the transmissions received in the first frequency band are received from users assigned to a first layer and from users assigned to a second layer. The users assigned to the first layer transmit at non-overlapping frequencies in the first frequency band with respect to one another, and the users assigned to the second layer transmit at non-overlapping frequencies in the first frequency band with respect to one another. The method further includes decoding transmissions received in a second frequency band associated with a second channel, where the second frequency band and the first frequency band are non-overlapping. The transmissions received in the second frequency band are received from users assigned to the first layer and from users assigned to the second layer. The users having transmissions in the second frequency band and assigned to the first layer transmit at non-overlapping frequencies in the second frequency band with respect to one another, and the users having transmissions in the second frequency band and being assigned to the second layer transmit at non-overlapping frequencies in the second frequency band with respect to one another.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 5 illustrates a layered OFDMA assignment process according to an example embodiment of the present invention.

DETAILED DESCRIPTION OF EXAMPLE EMBODIMENTS

As discussed in the Background of the Invention section, orthogonal frequency division multiple access (OFDMA) is effective at reducing in-cell interference because of the orthogonal property of OFDMA. However, OFDMA may not necessarily achieve high levels of sector capacity because allocated bandwidth chunks may become dominated by lower data-rate mobile users, which are less efficient from a sector capacity standpoint.

Interference Cancellation Code Division Multiple Access (IC-CDMA), on the other hand, is very efficient with respect to sector capacity because all users take advantage of the entire IC-CDMA frequency band. However, the process of interference cancellation in IC-CDMA systems may be prohibitive due to an increase in receiver complexity and processing requirements.

In order to better understand the present invention, a layered OFDMA system according to an example embodiment will be described, followed by example layered OFDMA processes performed within the example layered OFDMA system. Then, example applications of the layered OFDMA processes will be described in greater detail.

As will now be described, layered OFDMA processes performed within an OFDMA system in accordance with example embodiments of the present invention reduce the above-described sector capacity problems associated with conventional OFDMA, without a prohibitive increase in receiver complexity, using a variation of the interference cancellation associated with conventional IC-CDMA.

Layered OFDMA System

Figure 1:
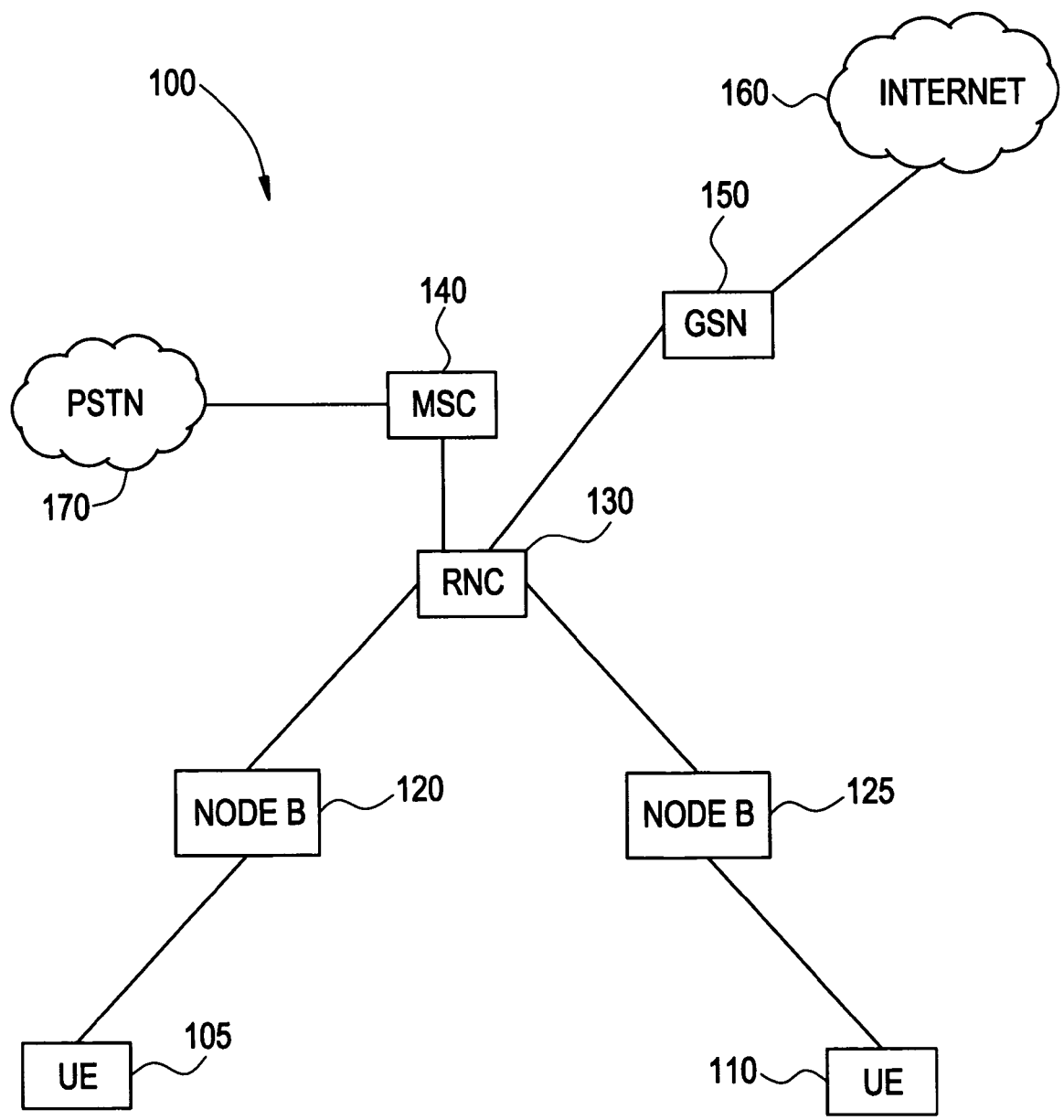
FIG. 1 illustrates a conventional wireless communication system.
Figure 2:
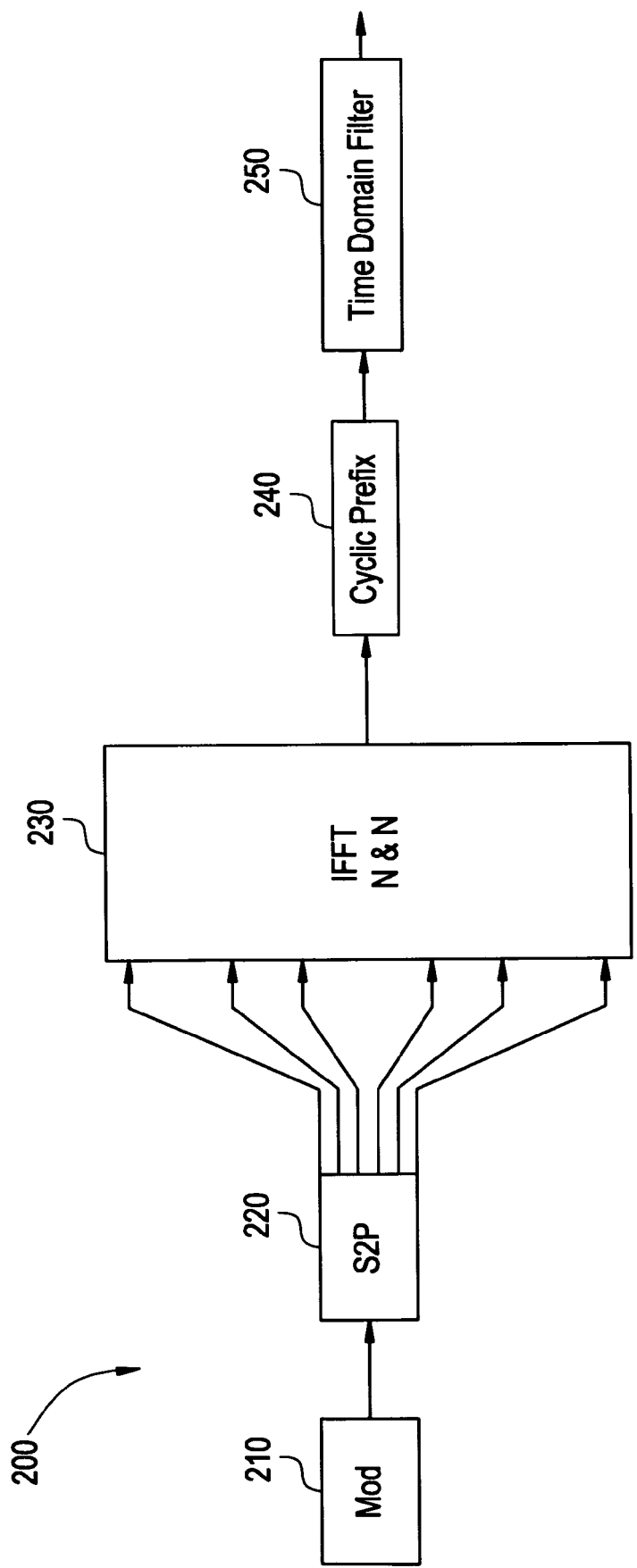
FIG. 2 illustrates a transmitter in a conventional OFDMA system.
Figure 3:
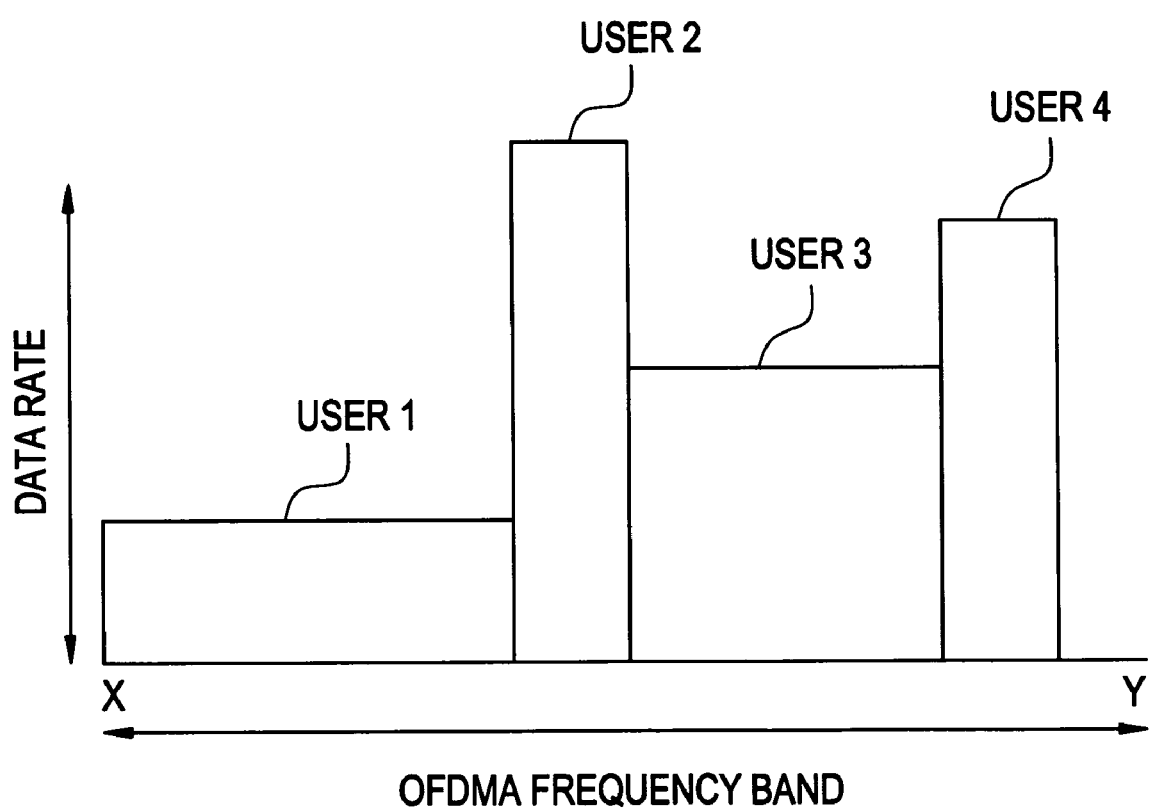
FIG. 3 illustrates a mobile user frequency allocation within a conventional OFDMA system.
Figure 4:
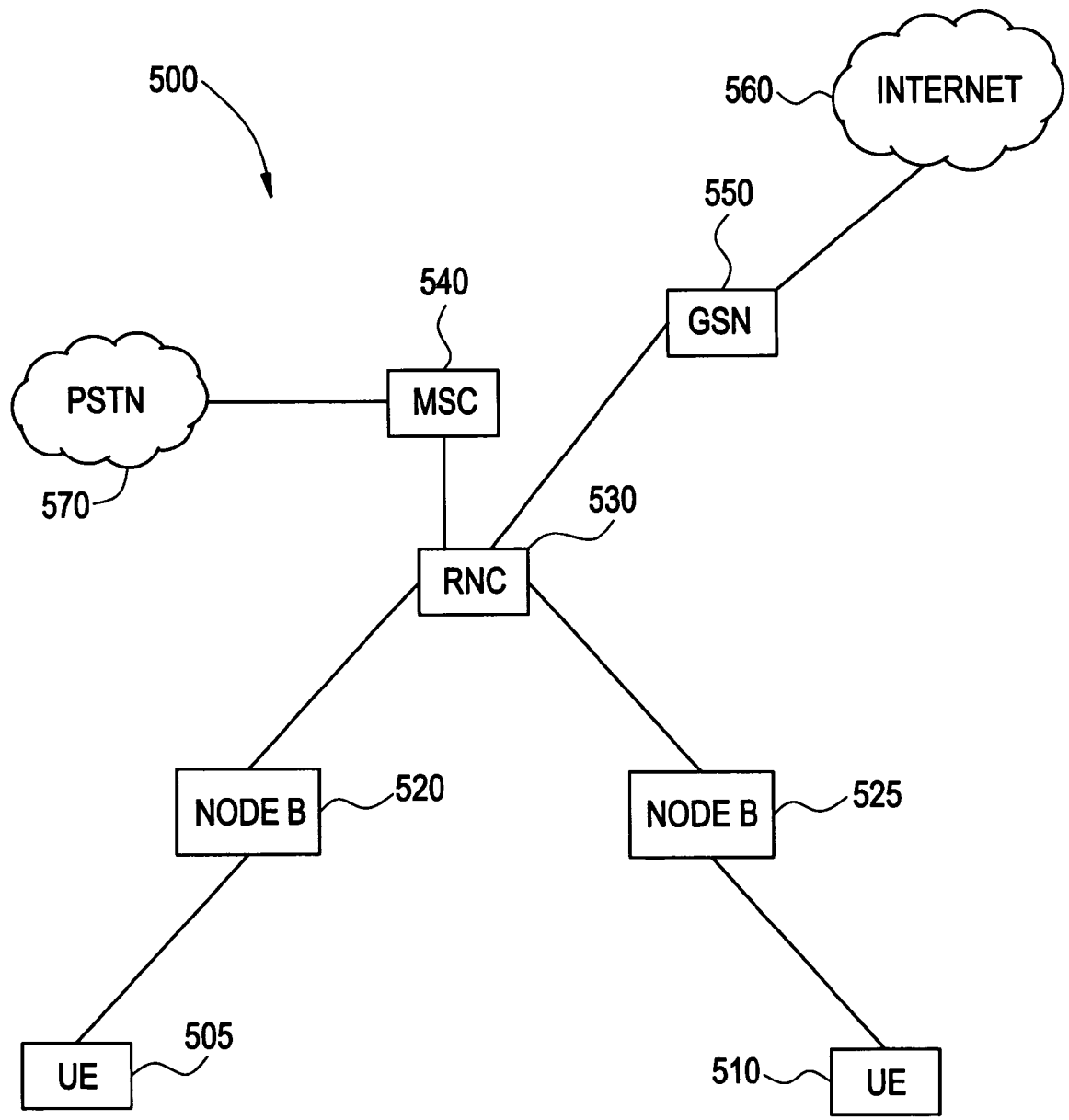
FIG. 4 illustrates a layered OFDMA system according to an example embodiment of the present invention.

FIG. 4 illustrates a layered OFDMA system 500 according to an example embodiment of the present invention. In the example embodiment of FIG. 4, the layered OFDMA system 500 includes a plurality of user equipments (UEs) 505/510 in communication with one or more serving Node Bs 520/525 over an air interface. The plurality of Node Bs are connected to a radio network controller (RNC) 530 with a wired interface. Alternatively, while not shown in FIG. 4, the functionality of both the RNC 530 and Node Bs 520/525 (alternatively referred to as "base stations") may be collapsed into a single entity referred to as a "base station router". The RNC 530 accesses an internet 560 through a gateway support node (GSN) 550 and/or accesses a public switched telephone network (PSTN) 570 through a mobile switching center (MSC) 540.

First Example Layered OFDMA Process

FIG. 5 illustrates a layered OFDMA assignment process according to an example embodiment of the present invention. In an example, the layered OFDMA assignment process of FIG. 5 may be performed at a base station (e.g., Node B 520, 525, etc.) within the layered OFDMA system 500 of FIG. 4. Hereinafter, the layered OFDMA assignment process of FIG. 5 will be described as performed at Node B 520. However, it will be understood that the layered OFDMA assignment process of FIG. 5 may alternative be performed at any number of base stations within the layered OFDMA system 500.

In step S600, a system designer selects a grouping criteria for grouping mobile users within the layered OFDMA system 500. In an example, the grouping criteria is signal strength or achievable spectral efficiency. The grouping criteria may include signal strength ranges such that any mobile user transmitting at a signal strength within a given group's range is assigned to the given group. In another example, signal interference may be used as the grouping criteria.

Next, in step S605, the mobile users currently being served by the Node 520 are assigned to one of a plurality of user groups in accordance with the selected grouping criteria. For example, if the grouping criteria is signal strength, the mobile users with similar signal strengths may be assigned to the same group. In this example, the grouping criteria may further include a plurality of non-overlapping signal strength ranges. Each user group is associated with one of the plurality of signal strength ranges, and each mobile user is assigned to the user group associated with the signal strength range within which its signal strength resides.

Each of the plurality of user groups is assigned to one of a plurality of layers in step S610. The layers are arranged in a prioritized hierarchy for decoding purposes, which will be described later. Each of the plurality of layers covers an entirety of the OFDMA frequency band, such that each layer overlaps in frequency with the other layers. Thus, in terms of frequency, each layer, which includes multiple OFDMA users, may be interpreted as similar to a single CDMA user because each layer uses an entirety of the OFDMA frequency band and each CDMA user likewise uses an entirety of the CDMA frequency band. However, unlike single CDMA users, each layer will include a plurality of mobile users assigned to orthogonal, and non-overlapping, chunks of bandwidth within the layer, as discussed in detail below with respect to step S615.

The layers are separated with interference cancellation, similar to IC-CDMA, which will be described in greater detail later. The modulation and coding scheme (MCS) and bandwidth for each user within the layer is explicitly allocated by the base station (e.g., Node B 520).

In step S613, the Node B 520 assigns layer specific mobile user pilot signal transmission protocols. Each mobile user within each layer is configured to operate in accordance with the same pilot signal transmission protocols. Mobile user pilot signal transmission protocols include, for example, the symbol and tone at which the mobile user pilot signal is transmitted. However, the mobile user pilot signal transmission protocols may further include, for example, pilot signal strength, duration, etc. For example, if a first and second layer are assigned a first user group and a second user group, respectively, the mobile users in the first user group transmit pilot signals using resources orthogonal to the resources used by the mobile users in the second user group to transmit their pilot signals.

Figure 6A:
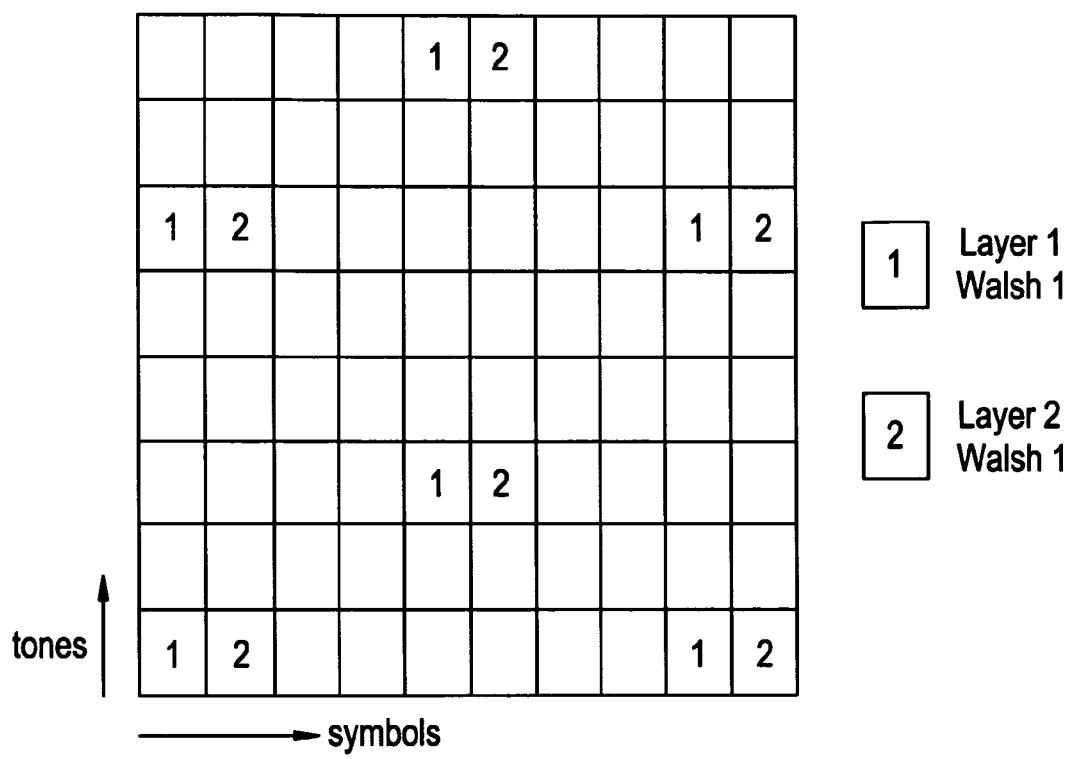
FIG. 6A illustrates a tone/symbol chart according to an example embodiment of the present invention.

FIG. 6A illustrates a tone/symbol chart for the first and second layers generated in accordance with step S610 of FIG. 5 according to an example embodiment of the present invention. As shown, the chart is a grid of rows representing OFDMA tones versus columns representing symbols for transmission. In particular, FIG. 6A illustrates pilot signal assignments within the tone/symbol chart for the first and second layers as assigned in accordance with step S613 of FIG. 5. In this example, the pilot symbols from layer 1 mobile users are assigned a first Walsh code (Walsh 1) and are transmitted at the assigned pilot tones. Similarly, mobile users from the second layer use the same Walsh code but at different pilot tone locations. Accordingly, as shown, the pilot signals for the first and second layers include orthogonal resources because they occupy non-overlapping bandwidth portions encoded with a first Walsh code (referred to as "Walsh 1").

Figure 6B:
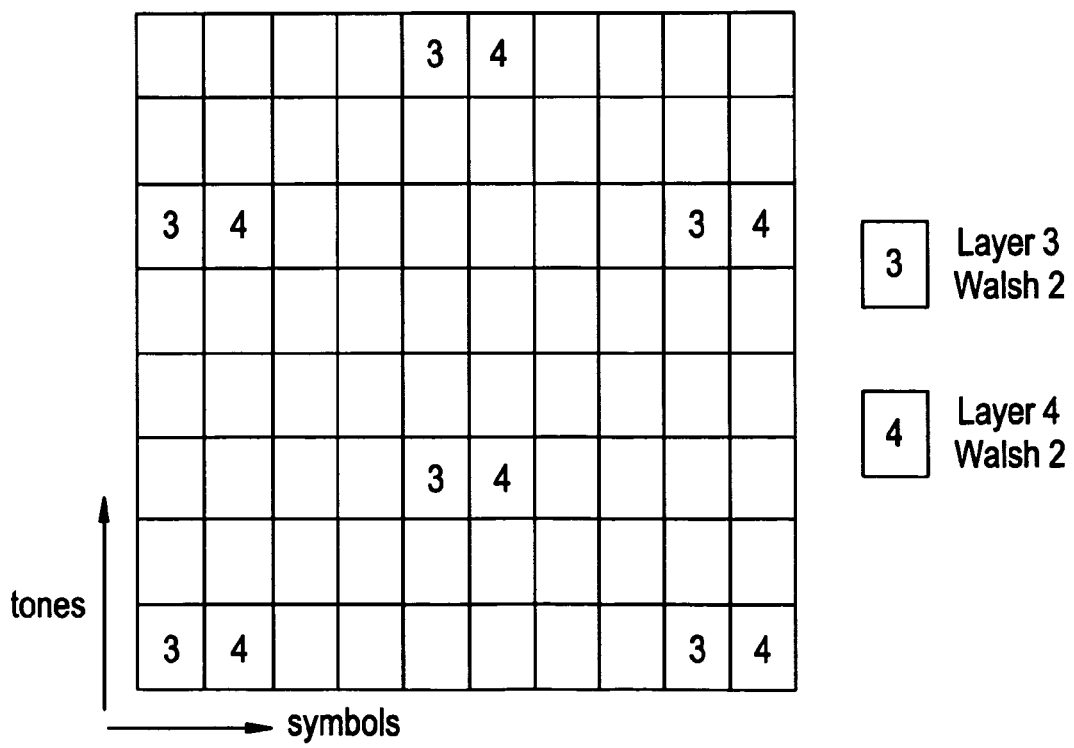
FIG. 6B illustrates another tone/symbol chart according to an example embodiment of the present invention.

FIG. 6B illustrates a tone/symbol chart for third and fourth layers generated in accordance with step S610 of FIG. 5 according to another example embodiment of the present invention. In particular, FIG. 6B illustrates pilot signal assignments within the tone/symbol chart for the third and fourth layers as assigned in accordance with step S613 of FIG. 5. As shown, the pilot signals for the third and fourth layers include orthogonal resources because they occupy non-overlapping bandwidth portions encoded with a second Walsh code (referred to as "Walsh 2"). Further, the pilots for the first layer and third layer overlap, and the pilots for the second layer and the fourth layer overlap. While not shown, it is understood that additional layers may be added similar to the third and fourth layers such that fifth and sixth layers would overlap with the first/third and second/fourth layers, respectively, and would be associated with a third Walsh code referred to as "Walsh 3", and so on.

Returning to FIG. 5, in step S615, each mobile user within a given user group is assigned a chunk of bandwidth, within which the mobile user may transmit, within the OFDMA frequency band. The assigned chunk of bandwidth is non-overlapping in the sense that mobile users do not interfere or overlap with other mobile users in the same user group or layer. However, because the layers interfere with each other, mobile users may interfere with mobile users in other layers. Generally, the Node B 520 distributes bandwidth to each mobile user within each individual layer in the same manner as in conventional OFDMA.

In step S620, the Node B 520 determines hopping patterns for each of the layers. A hopping pattern is a series of movements, rearrangements or reassignments of mobile users to different bandwidth chunks within the OFDMA frequency band in the same layer. In the example embodiment of FIG. 5, mobile users may "hop" to any bandwidth position within the OFDMA frequency band and in the same layer in accordance with a designated hopping pattern. In conventional OFDMA, hops are performed to reduce outer-cell interference. For example, if a neighboring OFDMA base station serves a mobile user which is interfering with a local mobile user, which typically will not be known at the Node B 520, the hopping pattern functions to diffuse this outer-cell interference to the mobile users within the layer because each mobile user hops to the interfering frequency band only for short periods of time. In an example, the hopping pattern may be randomly generated. In another example, if information regarding neighboring base station OFDMA interferers is known, the hopping pattern may take this into consideration so as to obtain a better hopping pattern than could be achieved randomly.

In step S625, the Node B 520 grants its served mobile users permission to transmit in accordance with steps S600 to S620. In an example, the Node B 520 may use conventional OFDMA signaling to instruct the served mobile users of their respective transmission permissions. For example, each grant may instruct a particular mobile user to transmit within particular bandwidth chunks of the OFDMA frequency band in accordance with a designated hopping pattern. It will be understood that an individual mobile user need not receive information regarding other mobile user transmission protocols. Thus, the Node B 520 keeps track of scheduling for its served mobile users, while each of the served mobile users is only aware of its own transmission permissions.

Figure 7:
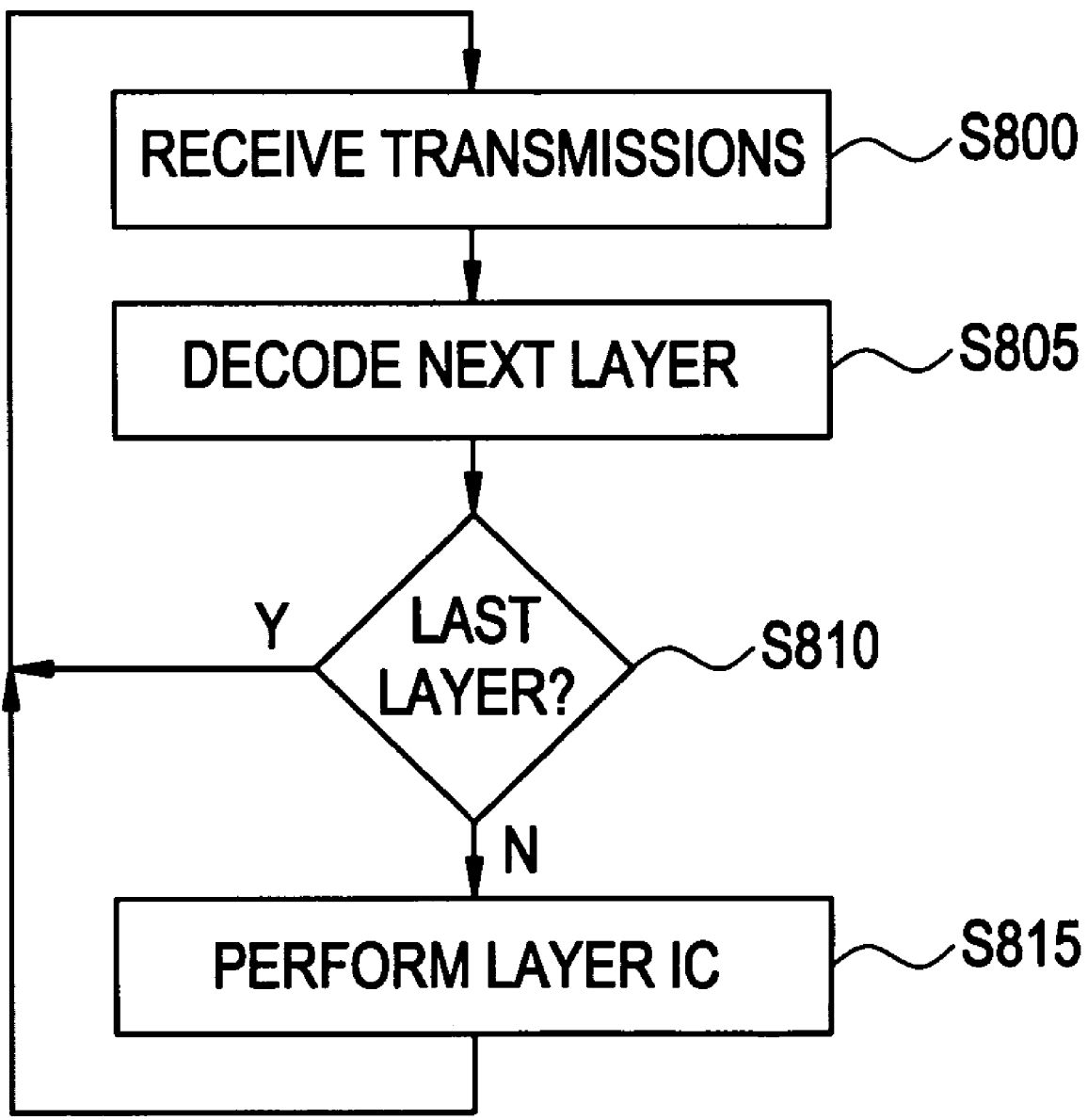
FIG. 7 illustrates a layered OFDMA decoding process according to an example embodiment of the present invention.

FIG. 7 illustrates a layered OFDMA decoding process according to an example embodiment of the present invention. In the example embodiment of FIG. 7, it may be assumed that each mobile user has a regular or single-user turbo decoder (e.g., not a joint decoder) that does not assume any knowledge of any interfering modulated symbols.

Initially, the process of FIG. 5 is performed to attain initial assignments of mobile users to a plurality of user groups and corresponding layers. To better understand the subsequent steps of FIG. 7, the steps will be described with respect to the example output of step S620 shown in FIG. 8. Namely, the process of FIG. 5 may result in the initial assignment illustrated in FIG. 8, which will now be described in greater detail.

Figure 8:
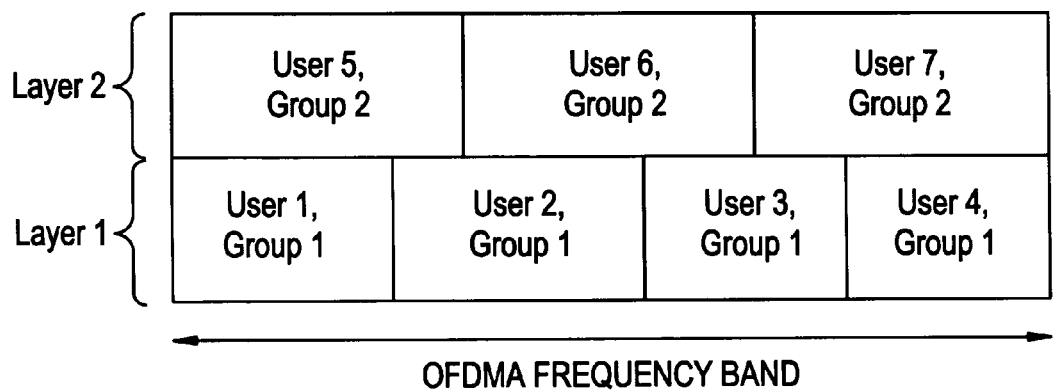
FIG. 8 illustrates an initial layer assignment according to an example embodiment of the present invention.

FIG. 8 illustrates an assumed initial layer assignment obtained according to the example embodiment of the present invention. In the example of FIG. 8, mobile users 1, 2, 3 and 4 are assigned to user group 1 and mobile users 5, 6 and 7 are assigned to user group 2. User group 1 is assigned to layer 1 and user group 2 is assigned to layer 2. The bandwidth allotted to the mobile users 1-4 within layer 1 and mobile users 5-7 in layer 2 directly overlap, and each layer collectively covers the entire OFDMA frequency band.

Returning to FIG. 7, and using the example of FIG. 8, after mobile users are granted permission to transmit in step S625 of FIG. 5, the process advances to step S800, and transmissions are received at the Node B 520 from each of the mobile users 1 through 7. In step S805, the highest priority layer is decoded by the Node B 520. In this example, the priorities are established by the grouping criteria selected in step S600 of FIG. 5. For example, the highest priority layer (alternatively referred to as the "earliest decoded layer", "first layer", or "layer 1") includes the user group with the mobile users having the highest signal strengths, and the lowest priority layer (alternatively referred to as the "latest decoded layer", "last layer", or, at least in FIG. 8, "layer 2") includes the user group with the mobile user having the lowest signal strengths. In FIG. 8, Group 1 is assigned to the highest priority layer and is decoded first in step S805.

In step S810, the Node B 520 determines whether the layer decoded in step S805 is the last layer to decode. If the Node B 520 determines that the last layer has been decoded, the process returns to step S800 and waits to receive additional transmissions. Otherwise, the process advances to step S815 to cancel interference for the next layer.

In step S815, the decoded signal from step S805 is used to cancel interference for the next decoded layer. Step S815 is the same as the interference cancellation performed between decodings of different mobile user signals as described in the Background of the Invention section with respect to IC-CDMA. Accordingly, after layer 1 is decoded successfully in step S805, re-estimation of the channel, re-encoding of the data and cancellation of the decoded signals for mobile users 1 through 4 from the residual received signal is performed. The process then returns to step S805 to decode layer 2 using the interference-canceled residual signal.

While the decoding process of FIG. 7 is being performed at the base station, each of the mobile users performs periodic hops in accordance with the hopping pattern selected by the system designer in step S620.

Figure 9:
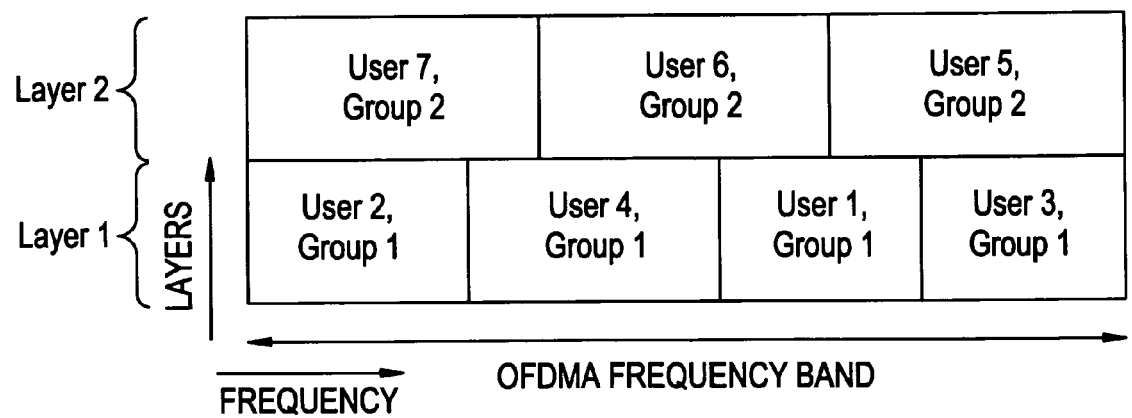
FIG. 9 illustrates a hopped layer assignment according to an example embodiment of the present invention.

FIG. 9 illustrates a hopped layer assignment according to an example embodiment of the present invention. In an example, the layer assignment of FIG. 9 may be hopped to from the layer assignment of FIG. 8. It will be appreciated that, in another example, the reverse may be true.

In the example embodiment of FIG. 9, the same mobile users remain in the same user groups and within the same respective layer as previously discussed with respect to FIG. 8. However, in the layer assignment of FIG. 9, the particular assignments of mobile users to bandwidth chunk has been shuffled within each respective layer. Further, the "bandwidth shuffling" or hopping is performed in a different manner in each of layers 1 and 2.

In conventional OFDMA, "single layer" hopping (e.g., because conventional OFDMA can only be said to employ one layer as herein described) is performed to reduce an affect of outer-cell interference on received mobile user transmissions. The hopping within each of layers 1 and 2 also functions to reduce outer-cell interference. However, the "independent" or separate hoppings for each of layers 1 and 2 further functions to reduce in-cell interference, as will now be explained. In the present context, independent hopping (e.g., also referred to as "group hopping") refers to different hopping patterns being applied in different layers. This may reduce the probability that the same mobile users in different layers will always occupy overlapping bandwidth chunks.

Because of the independent hopping, the mobile user interference for a given mobile user decoded within different iterations of step S805 may be based on different interfering mobile stations. Thus, symbols from the other interfering mobile users may not be granted enough transmission time within a given bandwidth chunk to form a valid code-word. Accordingly, it is easier for the decoder to distinguish between interfering mobile users and the desired mobile user's signal because the interfering signals are less likely to be good candidates for the desired signal. Thus, independent hopping helps the single-user decoder converge to the desired mobile user's signal.

Also, if one mobile user from an earlier layer (e.g., a higher priority layer or previously decoded layer) terminates, the interference to a set of mobile users on the other later decoded layers is reduced, improving their effective code-rate, and hence their chances of successful decoding. As a result of the group hopping, the affects of single user decoding are amortized over a range of users on the other layers, which may be desirable from a "fairness" point of view. Also, the variability in the interference between the mobile users in the subsequent layers reduces and the rate predictability for the subsequent layer's mobile users is easier to calculate and may be calculated with greater accuracy.

An example will now be given with respect to FIGS. 8 and 9. With respect to FIG. 8, as discussed above, mobile users 1-4, within layer 1, occupy disjoint frequency bands or bandwidth chunks, as in conventional OFDMA systems. Users 5-7, within layer 2, also occupy the same total OFDMA frequency band and interfere with the first layer or layer 1 mobile users. Assume users 5-7 transmit with lower MCS, while the first layer users transmit with an aggressive MCS that takes into account the expected interference seen from the second layer users. Assume user 2 in the first layer decodes successfully in step S805. The interference in the first hop to Users 5 and 6 will be reduced after cancellation of User 2's signal in step S815. In the second hop, as shown in FIG. 9, the interference to User 7's signal will be reduced because User 7 is now aligned, in terms of bandwidth, with User 2. Thus, the successful decoding of a mobile user from the first layer has beneficial effects on all the mobile users in the second layer in this example. It is understood that, in other examples, less than all of the mobile users in later layers may experience beneficial effects from the successful decoding of any particular earlier layer mobile users, and that this largely depends on the hopping pattern, the number of mobile users within the respective layers and the size of the bandwidth chunk used by the successfully decoded mobile user.

Second Example Layered OFDMA Process

The example layered OFDMA process described above with respect to FIGS. 5 to 9 is directed to evening out or diffusing the interference and the interference cancellation gains across multiple mobile users over an entire layer or OFDMA frequency band. Accordingly, to maintain receiver complexity at the Node B 520 at reasonable levels, the example embodiments of FIGS. 5 to 9 are described as being employed with single-user decoders. In other words, each mobile user is decoded without "directly" or "jointly" taking into account the decoding of other mobile users. However, as described above, the decoding of mobile users in earlier decoded layers is "indirectly" taken into account in later decoded layers via the layer interference cancellation described above.

An example will now be described wherein joint decoders are employed in place of the single-user decoders described with respect to FIGS. 5 through 9. In order to deploy the joint decoders without prohibitive increases to the processor requirements at the receiver, additional layer restrictions are set forth.

Generally, while the above-described example embodiments of FIGS. 5 to 9 seek to diffuse or spread interference among multiple mobile users within a layer via independent hopping patterns at different layers, the example joint decoding scheme configures the layers so as to include channels common to the layers, with the mobile users restricted to remain within an assigned channel, even if hopping within the channel is allowed. Accordingly, in the following example, a joint decoder, configured for a relatively small number of users (e.g., the mobile users within a given channel of the layers), iteratively decodes the mobile users from all the layers in that channel and improves the Log-Likelihood Ratios (LLRs) of each of the mobile users in that channel concurrently.

Figure 10:
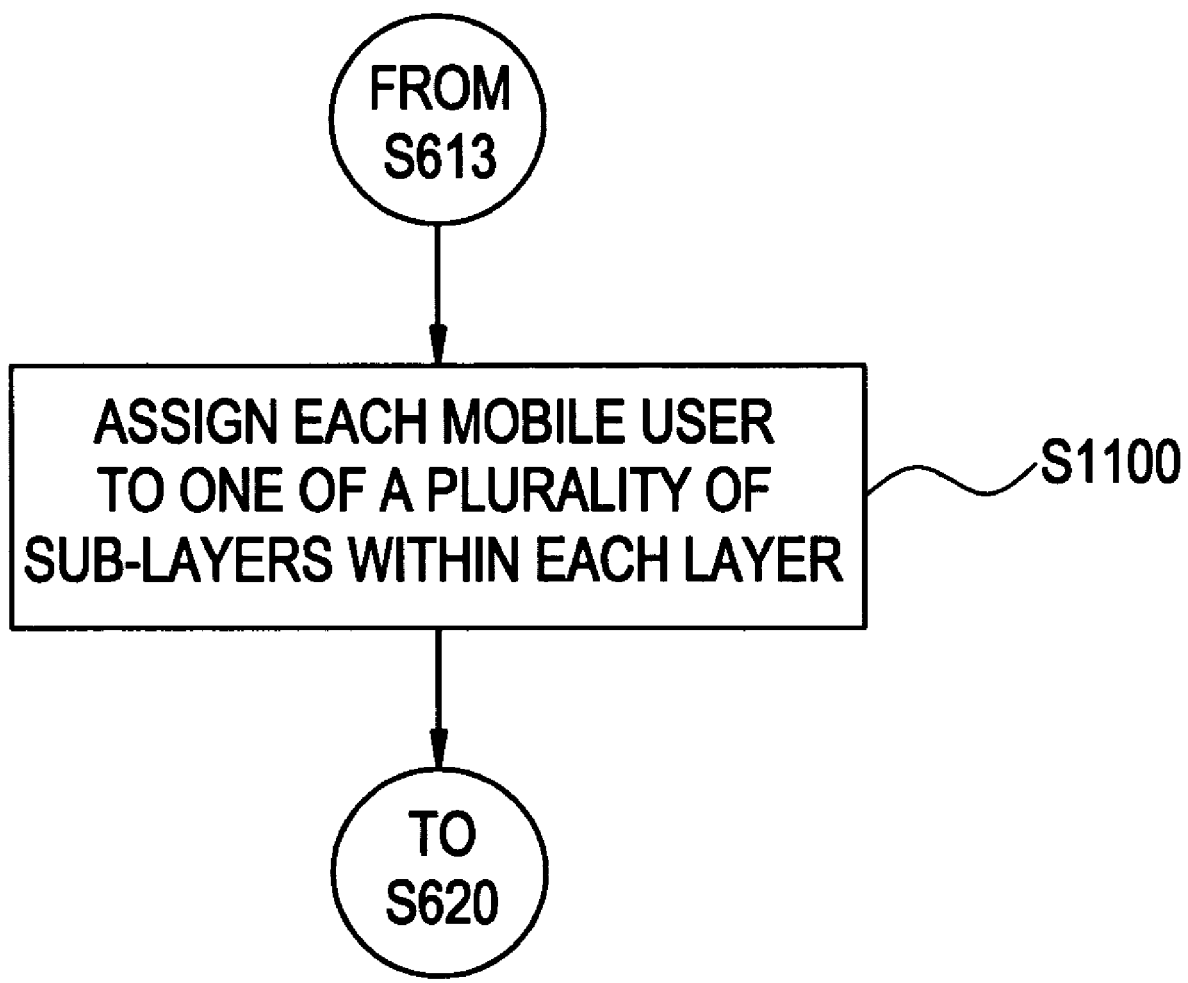
FIG. 10 illustrates a channel OFDMA assignment process according to an example embodiment of the present invention.

FIG. 10 illustrates a channel OFDMA assignment process according to an example embodiment of the present invention. The process of FIG. 10 is similar to the above-described process of FIG. 5, except that step S1100 is performed in place of step S615 of FIG. 5. In step S1100, after the mobile users are assigned pilot signal transmission protocols in step S613, each mobile user is assigned to one of a plurality of channels. In an example, the channels may occupy the same bandwidth chunks or frequency ranges across all layers.

The process of FIG. 10 is performed to attain initial assignments of mobile users to a plurality of user groups, layers and channels. In an example, the process of FIG. 10 results in the initial assignment illustrated in FIG. 11, which will now be described in greater detail.

Figure 11:
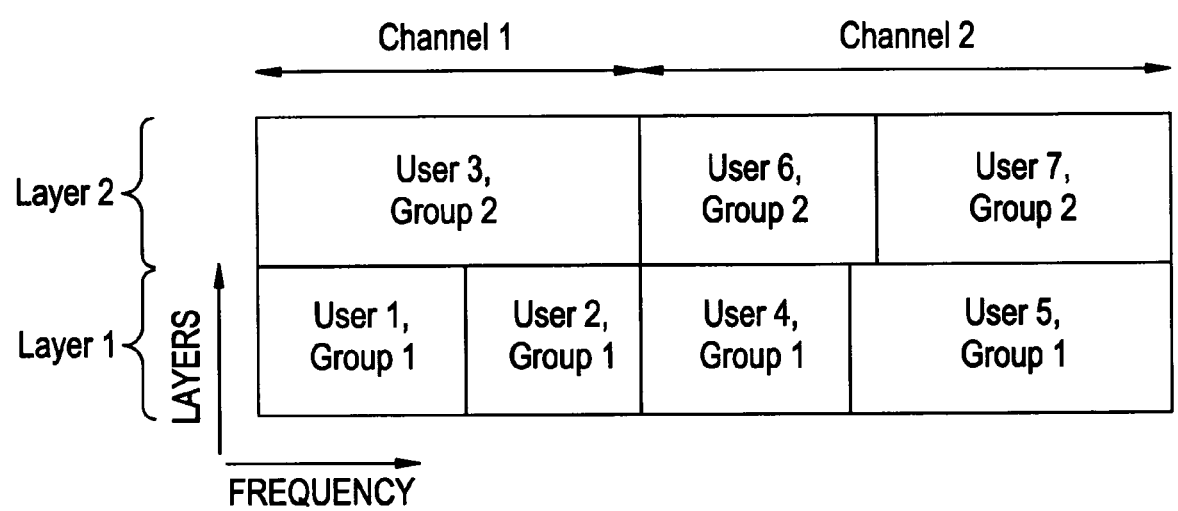
FIG. 11 illustrates a channel OFDMA decoding process according to an example embodiment of the present invention.

FIG. 11 illustrates an example of a channel assignment according to another example embodiment of the present invention. In the example, mobile users 1, 2, 4 and 5 are assigned to user group 1 and layer 1, and mobile users 3, 6 and 7 are assigned to user group 2 and layer 2. Further, mobile users 1, 2 and 3 are assigned to channel 1 and mobile users 4, 5, 6 and 7 are assigned to channel 2.

After step S1100 of FIG. 10, the process advances to step S620 of FIG. 5. In step S620, a system designer determines the hopping pattern for each mobile user. The hopping pattern restricts mobile users such that only hops which result in mobile users remaining in both the same layer and channel are allowed. After the hopping pattern for each of the mobile users is determined, the process advances to step S625 of FIG. 5 and each of the mobile users is granted permission to transmit in accordance with the designated bandwidth chunks and hopping patterns, and then the process advances to step S1200 of FIG. 12, which will now be described.

Figure 12:
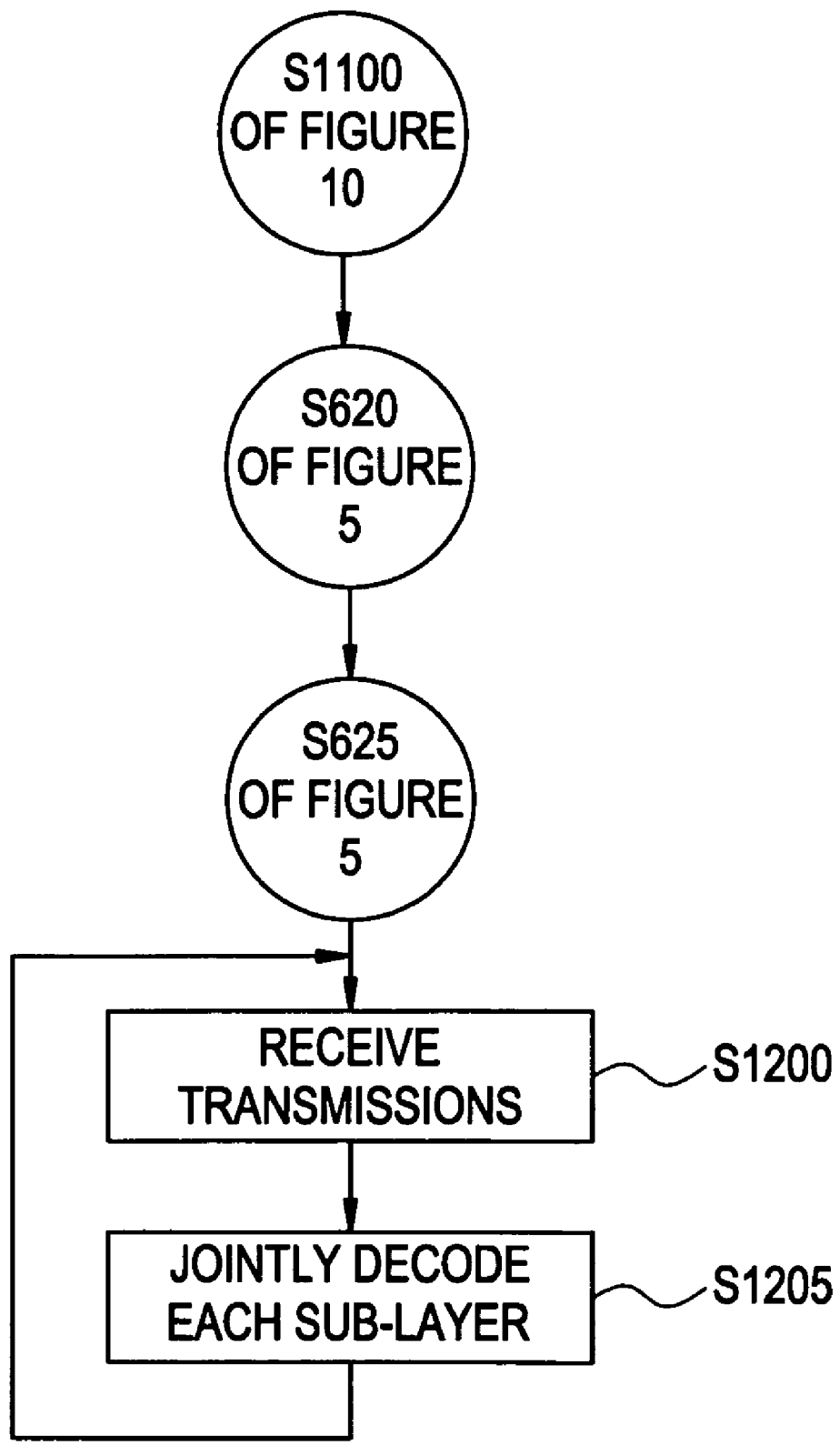
FIG. 12 illustrates a channel assignment according to an example embodiment of the present invention.

FIG. 12 illustrates a channel OFDMA decoding process according to an example embodiment of the present invention. In the example embodiment of FIG. 12, it may be assumed that each mobile user within a given channel is jointly decoded with the same joint decoder.

In step S1200, transmissions are received at the Node B 520 from each of the mobile users 1 through 7. In step S1205, a first joint decoder decodes signals for channel 1 (e.g., for mobile users, 1, 2 and 3) and a second joint decoder decodes signals for channel 2 (e.g., for mobile users 4, 5, 6 and 7).

The decoding of step S1205 may be achieved, for example, by using an iterative decoding approach that iterates across users to improve the LLR of all users. Thus, in the approach described with respect to FIGS. 5 to 9, mobile users did not see any benefit in terms of reduced interference until at least one user from a previous layer was decoded successfully, because the previous layer mobile user signals are only removed or canceled from the spectrum after successful decoding. In contrast, in the joint decoding approach of FIGS. 10 to 12, all mobile users may see continual improvements in LLR as the iterations increase. While successful decoding may substantially help mobile users within the same channel, the incremental improvement due to successful decoding may be increased with the above-described channel hopping process, which is performed by the mobile users during the process of FIG. 12 in accordance with the selected hopping pattern from step S620 of FIG. 5. In an alternative example, for simplicity, step S620 of FIG. 5 may be skipped in the example process of FIG. 12 such that hopping within channels is not performed.

Example Application

Figure 13:
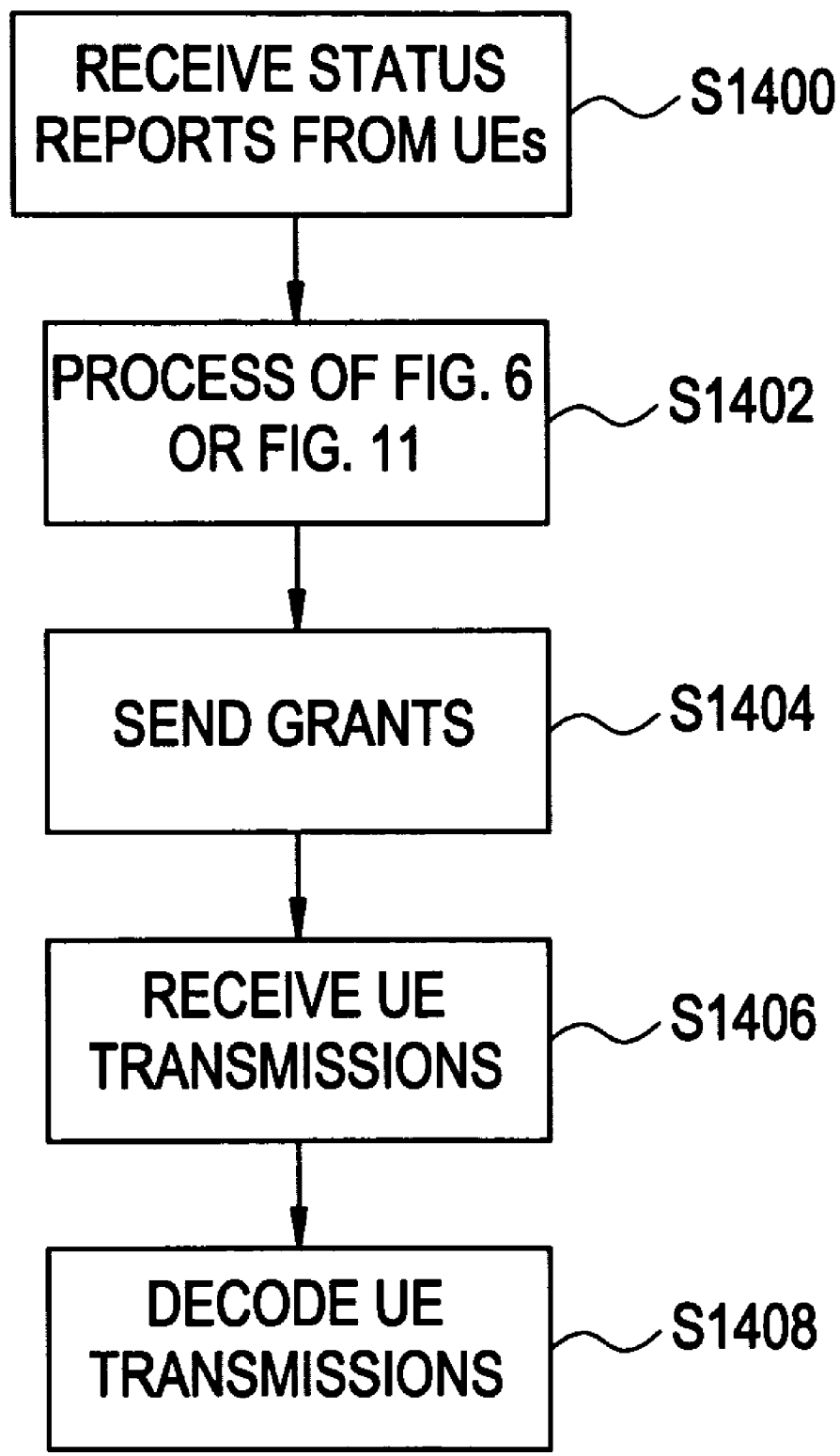
FIG. 13 illustrates an example application for layered OFDMA assignment and decoding within the OFDMA system of FIG. 4.

FIG. 13 illustrates an example application for layered OFDMA assignment and decoding within the OFDMA system 500 of FIG. 4.

In step S1400, the Node B 520 receives status reports from the UE 505 and all other UEs served by the Node B 520. For example, the status reports include maximum power per tone allowed, power headroom, buffer fullness, etc. Based on the status reports, a scheduler at the Node B 520 either performs the process of FIG. 6 or FIG. 11 in step S1402. Accordingly, in step S1402, the scheduler classifies reporting mobile users or UEs into a plurality of user groups, layers, and if operating in accordance with the process of FIG. 11, channels. Generally, a first layer or earliest decoded layer is set to the most aggressive settings (e.g., higher modulation and code-rates and faster HARQ termination targets).

In an example, the last layer or latest decoded layer may include cell edge users (e.g., mobile users positioned close to the boundary of Node B 520's cell) and may occupy a larger amount of bandwidth such that mobile users among the last layer transmit their signals by spreading to a larger bandwidth with frequency domain spreading. Thus, the mobile users within the last layer need not be orthogonal, and will interfere with each other as in a CDMA system. These mobile users may be separated either with a conventional rake receiver, or with an interference cancellation receiver as in IC-CDMA. Accordingly, portions of signals from cell edge users in other cells may be reduced, which may increase sector capacity due to reduced outer-cell interference. This also improves interference stability for the higher-data rate mobile users (e.g., in earlier decoded layers).

Channel estimation performed for the first two layers (e.g., the two earliest decoded layers) of mobile users is based on orthogonal resources (e.g., see FIGS. 6A and 6B and the descriptions thereof). Pilot cancellation is performed based on these estimates, and channel estimation is performed for the later layers after the pilot interference cancellation.

In step S1404, grants are sent to all mobile users, as previously described with respect to step S625 of FIG. 5, in accordance with the determined layer and hopping assignments of step S1402. The grants may include MCS, channel, transmit power per tone offset, and the pilot pattern structure or tone/symbol charts to be used (e.g., see FIGS. 6A and 6B). Mobile users also receive Interference Activity Bit (IAB)s to determine their maximum allowed transmit power per tone.

The mobile users, including the UE 505, transmit to the Node B 520 in step S1406 and the Node B 520 receives the transmissions in step S1406. The Node B 520 then decodes the received transmissions in step S1408. The decoding of step S1408 may be performed in accordance with either the single-user decoding process described with respect to FIGS. 5 to 9, or alternatively with the joint decoding process described with respect to FIGS. 10 to 12.

If the single-user decoding process of FIGS. 5 to 9 is used in step S1408, the receiver at the Node B 520 decodes the first layer mobile users (step S805 of FIG. 7). Once at least one mobile user in the layer is decoded, re-estimation of the channel is performed in the frequency domain using the demodulated data symbols as additional pilot reference to improve the channel estimation reliability (step S815 of FIG. 7). Based on reliability of the final channel estimate, partial cancellation is performed on the frequency domain composite received signal (step S815 of FIG. 7). This may take into account effects such as frequency offset of the decoded user. After decoding is attempted for all first layer users, the receiver decodes second layer users (returning to step S805 of FIG. 7) and performs interference cancellation (returning to step S815 of FIG. 7). While not illustrated in FIG. 7, the decoding process may return to the first layer to decode any failed decodings from the first layer before moving on to a third layer, and so on. It will be appreciated that any previously decoded layer may be returned to if any failed decodings occur.

If the joint-user decoding process of FIGS. 10 to 12 is used in step S1408, the receiver performs joint decoding (e.g., either optimal maximum a Posteriori Probability (MAP) or iterative soft decoding for all users within a channel). The joint decoders assigned to the different channels decode independently (step S1205 of FIG. 12). The LLRs for all mobile users within a given channel continuously improve with additional iterations (e.g., of the loop including steps S1200 and S1205 of FIG. 12). Once a user decodes successfully, the continual LLR improvement is achieved by setting prior probabilities to 1 or 0 depending on the decoded bit, effectively performing interference cancellation because the bits of that user are then assumed to be known exactly. Channel LLRs may also take into account reliability of channel estimates by considering a channel estimation error model during the LLR computation. For example, if a symbol from a user is known exactly and its channel estimate is very unreliable, the knowledge of the decoded symbol typically will not help in refining the LLR. Thus the confidence placed on canceling the symbol from the received signal will be very low. However, if the channel estimate is very reliable, then the signal from that user can be cancelled with greater confidence, and will result in an improvement in the LLR.

Example embodiments of the present invention being thus described, it will be obvious that the same may be varied in many ways. For example, while above-described with respect to OFDMA, it will be appreciated that similar methodologies may be applied in any wireless communication system (e.g., a UMTS system).

Such variations are not to be regarded as a departure from the example embodiments of the invention, and all such modifications are intended to be included within the scope of the invention.

I claim:

1. A method of scheduling transmission in a wireless communication system, comprising:
    assigning users, at a network element, to one of at least a first layer and a second layer, each of the first and second layers associated with a same frequency band;
    assigning, at the network element, the users in the first layer to different frequency sub-bands in the frequency band such that the users in the first layer have non-overlapping first sub-band assignments;
    assigning, at the network element, the users in the second layer to different frequency sub-bands in the frequency band such that the users in the second layer have non-overlapping second sub-band assignments; and
    scheduling, at the network element, the users for transmission based on the first and second layer and the first and second sub-band assignments.

2. The method of claim 1, further comprising:
    assigning the users in the first layer to a first hopping schedule for changing the first sub-band assignments; and
    assigning the users in the second layer to a second hopping schedule for changing the second sub-band assignments, the first and second hopping schedules being different.

3. The method of claim 2, wherein the first and second hopping schedules each include a plurality of hops, the plurality of hops restricted such that users remain in their assigned layers.

4. The method of claim 3, wherein the first and second hopping schedules are established such that the first sub-band assignments of the users in the first layer overlapping in frequency with the second sub-band assignments of the users in the second layer change.

5. The method of claim 1, wherein transmissions from the users in the first layer are scheduled to be decoded before transmissions from the users in the second layer.

6. The method of claim 5, wherein the assigning users to one of at least a first and second layer step assigns users to the first and second layers based on average signal strength of the users, and the users in the first layer have a higher average signal strength than the users in the second layer.

7. The method of claim 1, wherein the assigning users to one of at least a first and second layer step assigns users to the first and second layers based on average signal strength of the users, and the users in the first layer have a higher average signal strength than the users in the second layer.

8. The method of claim 1, further comprising:
    assigning the users in the first layer to one of at least a first and second channel, the first and second channels having a first channel frequency band and a second channel frequency band, respectively, that each falls within the same frequency band of the first and second layers, and the first frequency band and the second frequency band being non-overlapping; and
    assigning the users in the second layer to one of at least the first and second channel.

9. The method of claim 8, further comprising:
    assigning the users in the first layer to a first hopping schedule for changing the first sub-band assignments; and
    assigning the users In the second layer to a second hopping schedule for changing the second sub-band assignments, the first and second hopping schedules being different.

10. The method of claim 8, wherein the first and second hopping schedules each include a plurality of hops, the plurality of hops restricted such that the users remain in both their assigned layers and their assigned channels.

11. The method of claim 10, wherein the first and second hopping schedules are established such that the first sub-band assignments of the users in the first layer overlapping in frequency with the second sub-band assignments of the users in the second layer change.

12. The method of claim 8, further comprising:
    jointly decoding transmissions from the users of the first and second layers assigned to a same one of the first and second channels.

13. A method of decoding transmissions in a wireless communication system, comprising:
    first decoding first transmissions received from a first set of mobile users assigned to a first layer, the first transmissions received on a first set of non-overlapping frequencies within the first layer;
    cancelling the first decoded transmissions from a received signal spectrum to obtain a cancelled signal spectrum; and second decoding second transmissions received from a second set of mobile users assigned to a second layer in the cancelled signal spectrum, the second transmissions received on a second set of non-overlapping frequencies within the second layer, the first and second layers associated with a same frequency band.

14. The method of claim 13, wherein the first decoded first transmissions have a higher average signal strength than the second decoded second transmissions.

15. The method of claim 13, further comprising:

repeating the cancelling and second decoding steps for transmissions received from additional sets of mobile users, each of the transmissions from the additional sets of mobile users being received on a respective set of non-overlapping frequencies, and the additional sets of non-overlapping frequencies overlapping with each other and further overlapping with the first and second sets of non-overlapping frequencies.

16. A method of decoding mobile station transmissions in a wireless communication system, comprising:

decoding transmissions received In a first frequency band associated with a first channel, the transmissions received in the first frequency band being received from users assigned to a first layer and from users assigned to a second layer, the users assigned to the first layer transmitting at non-overlapping frequencies in the first frequency band with respect to one another, and the users assigned to the second layer transmitting at non-overlapping frequencies In the first frequency band with respect to one another; and decoding transmissions received in a second frequency band associated with a second channel, the second frequency band and the first frequency band being non-overlapping, the transmissions received in the second frequency band being received from users assigned to the first layer and from users assigned to the second layer, the users having transmissions in the second frequency band and assigned to the first layer transmit at non-overlapping frequencies in the second frequency band with respect to one another, and the users having transmissions in the second frequency band and being assigned to the second layer transmit at non-overlapping frequencies in the second frequency band with respect to one another.

17. The method of claim 16, wherein the decoding transmissions received in the first frequency band step is performed by a first joint decoding operation and the decoding transmissions received in the second frequency band step is performed by a second Joint decoding operation separate from the first joint decoding operation.

18. The method of claim 16, wherein the decoding transmissions received in the first frequency band step is performed at a same time as the decoding transmissions received in the second frequency band step.

* * * * *